United States Patent

[11] 3,593,223

[72] Inventors Howard Gurnos King; Graham Pye, both of London, England
[21] Appl. No. 848,026
[22] Filed Aug. 6, 1969
[45] Patented July 13, 1971
[73] Assignee International Standard Electric Corporation New York, N.Y.
[32] Priority Aug. 15, 1968
[33] Great Britain
[31] 39008/68

[54] ELECTRIC WAVE FILTER EMPLOYING INTERDIGITAL LINE STRUCTURES
10 Claims, 3 Drawing Figs.

[52] U.S. Cl. .......... 333/73, 333/735
[51] Int. Cl. .......... H03h 13/00, H01p 7/00, H01p 5/02
[50] Field of Search .......... 333/73, 73 C, 73 S, 73 W, 70, 70 S

[56] References Cited

UNITED STATES PATENTS

| | | | |
|---|---|---|---|
| 3,093,801 | 6/1963 | Bland | 333/73 X |
| 3,200,353 | 8/1965 | Okwit | 333/73 X |
| 3,327,255 | 6/1967 | Bolljahn et al. | 333/73 |
| 3,505,618 | 4/1970 | McKee | 333/73 |

*Primary Examiner*—Herman Karl Saalbach
*Assistant Examiner*—Wm. H. Punter
*Attorneys*—C. Cornell Remsen, Jr., Walter J. Baum, Percy P. Lantz, J. Warren Whitesel, Delbert P. Warner and James B. Raden

ABSTRACT: Interdigital electric wave filters are proposed which use mechanical structures having dimensions of less than one-quarter wavelength making the filter electrically resonant at frequencies of interest. Rod elements forming the interdigital structures are connected at one end or the other to the ground plane. The input and output connections are made to points on the ground plane adjacent to the outermost rod elements to provide an impedance close to the value of the characteristic impedance of the coupling cable.

Inventors
H. G. KING G. PYE
By B. J. Warner
Attorney

ELECTRIC WAVE FILTER EMPLOYING INTERDIGITAL LINE STRUCTURES

This invention relates to electric wave filters and particularly to ultrahigh frequency filters using interdigital line structures.

At frequencies above 200 MHz. filters using lumped constants present constructional difficulties as the values of inductance and capacitance required make the circuit elements physically very small and the tolerances when manufacturing the elements very tight and expensive to maintain. Alternatively, if less precise components are used much time is spent on test and alignment. Filters have therefore been devised using simple mechanical structures whose dimensions make them electrically resonant at these frequencies.

These structures form distributed rather than lumped electrical constants and coupling is inductive and/or capacitive through a dielectric isolating the elements of the structure to prevent direct electrical contact.

According to the invention there is provided an interdigital filter in which one or the other end of each of the rod elements is connected to the ground plane and in which the input and output connections are made to respective points on the ground plane adjacent the outermost rod elements at regions thereof having an impedance close to the value of the characteristic impedance of the coupling cable.

Embodiments of the invention will now be described with reference to the accompanying drawings in which.

Figures 1, 2:
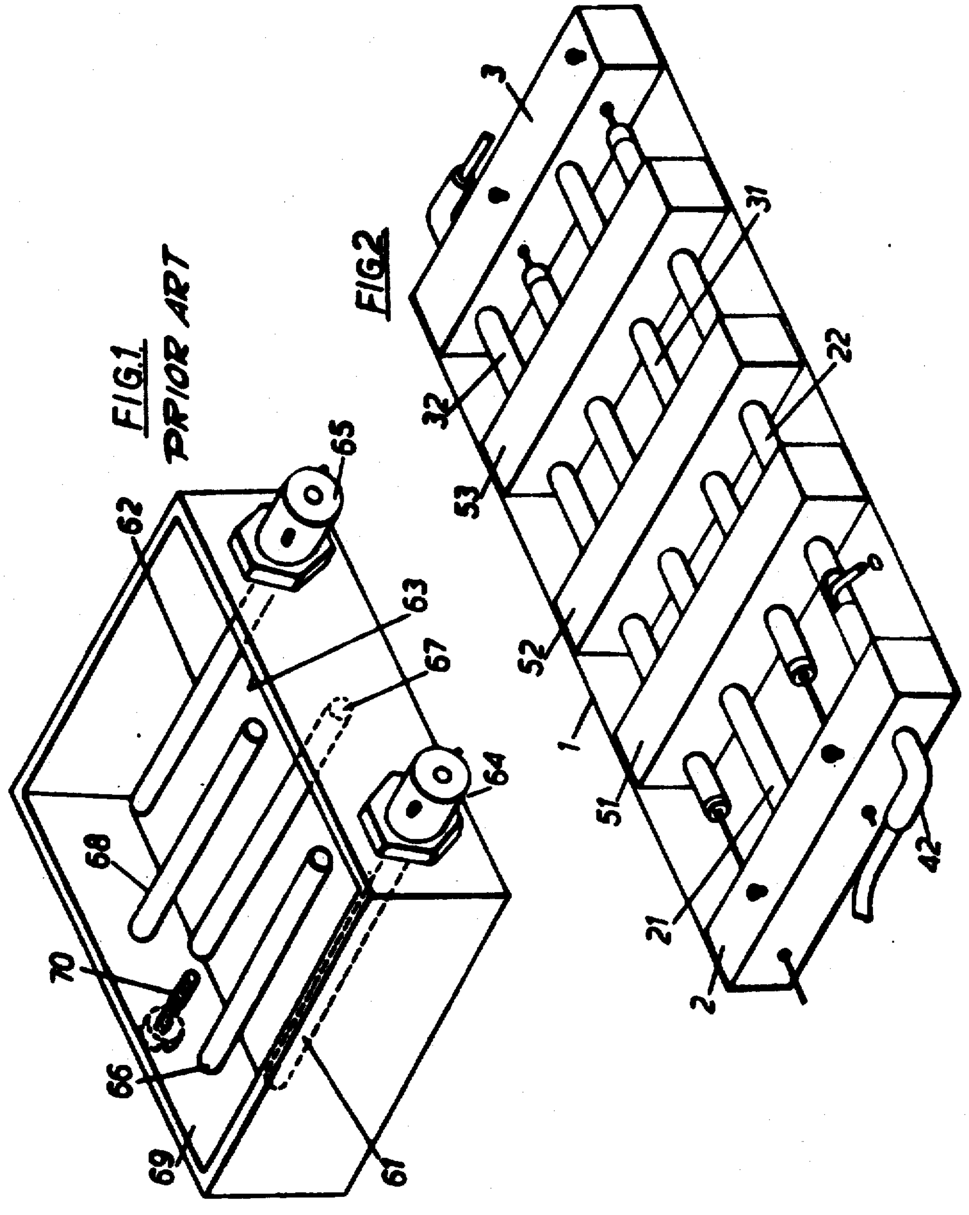
FIG.1 PRIOR ART, FIG.2
FIG. 1 shows a typical interdigital filter of known form.
FIG. 2 shows filter embodying the invention.

The interdigital arrangement is one form of mechanical structure used to make electrical networks for ultrahigh frequencies and is an array of parallel lines between ground planes, as shown in FIG. 1 with the upper ground plane removed.

This arrangement includes several rods 61, 62, 66, 67, 68, of conducting material supported within a rigid cavity with a conducting inner surface. The cavity is usually shallow compared to its length and breadth. The rods are placed side by side parallel to the shorter side (breadth) of the cavity and the outermost ones electrically insulated from the cavity, one end of alternate ones of the remaining rods is attached to one longer sidewall 69 while the rest of the rods are attached by one end to the opposite longer sidewall, 63.

The outermost rods 61 and 62 are input and output coupling elements and are isolated from the wall 63 on which they are mounted. Coaxial connectors 64 and 65 are provided for each of these rods. The inner contact of the connector is connected to the rod and the outer contact, or braid, is connected to the inner surface of the cavity. The top and bottom surfaces of the cavity are the ground planes and the electric field from a signal connected to the input coupling element is propagated between these ground planes and within the walls of the cavity. All the rods are cut to a length of about λ/4 and the cavity is made just large enough to accommodate them, the ground plane spacing being critical. Tuning of individual rods when required is by adjusting a screw 70 towards or away from the free end of the rod.

Figure 3:
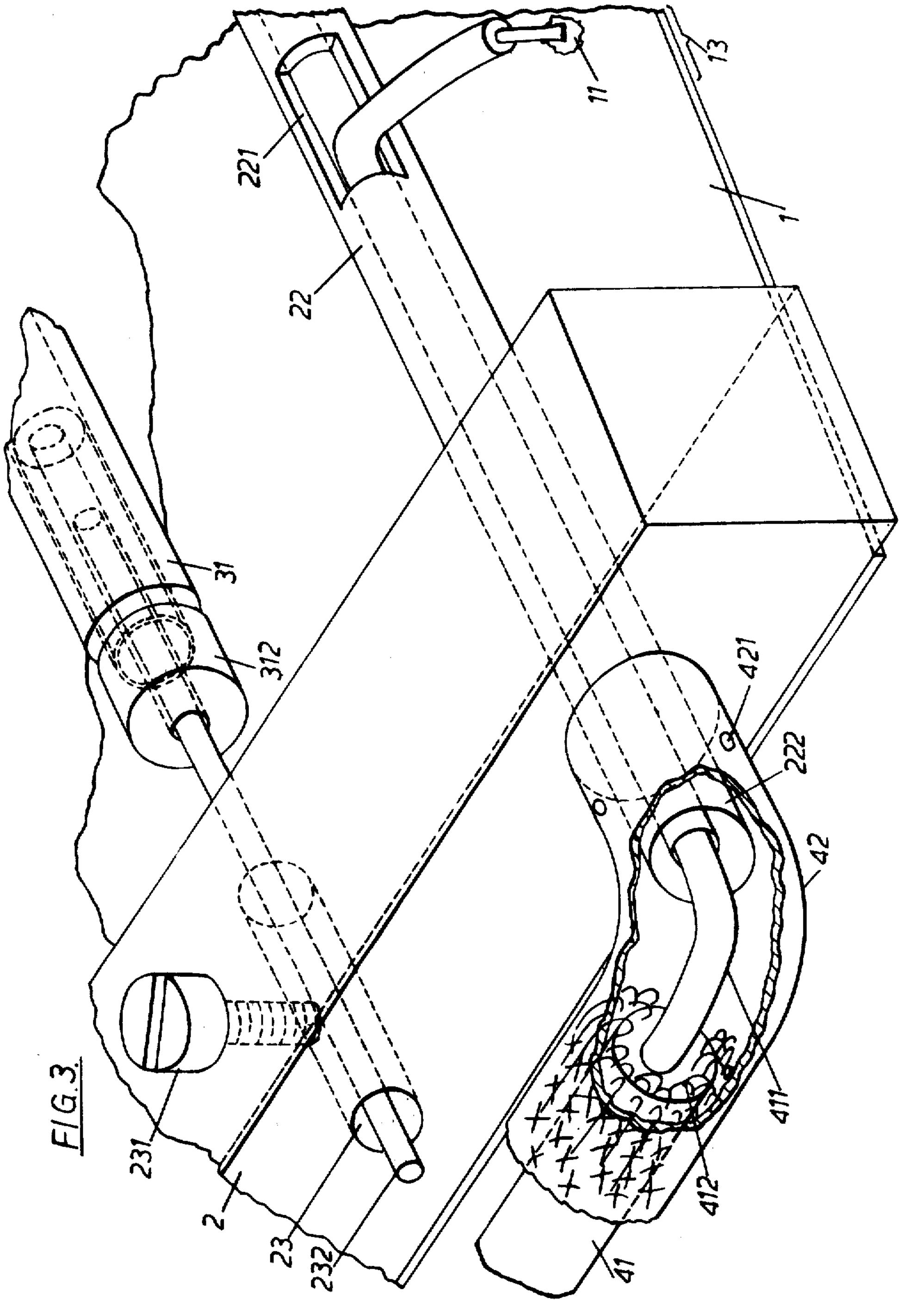
FIG. 3 is an enlarged detail of FIG. 2, partly in section.

FIG. 2 shows an interdigital filter embodying the invention. The structure of the filter is described first. End blocks 2 and 3, are provided with two hollow rod elements 21, 22 and 31, 32 respectively. The blocks are preferably brass and the rods copper. The rod dimensions depend on the frequency for which the filter is intended but in a preferred embodiment the rods are some 10—15 percent less in length than a quarter wavelength of the design frequency and have a diameter to produce a characteristic impedance of some 70 Ω, this being the impedance at which maximum Q is obtained from such a rod. The rods are brazed to the end blocks, passing through holes in the blocks as shown in FIG. 3. Rods 22 and 32 protrude from the block a short distance while rods 21 and 31 end flush with the block's outer surface. Slots 321 (not shown) and 221 in rods 32 and 22 respectively are cut to permit access to the hollow core of the rods.

The exact position of the slots depends on electrical considerations and will be discussed below. In the preferred embodiment there are holes 24, 33 and 34 (not shown) and 23 (FIG. 3) through the end blocks at the assembled position of the rods attached to the opposite end block. Each hole has a setscrew (231 for example) to hold a piece of bare metal wire (232 for example) mechanically in position and electrically in contact with the block. The outer end of each rod has an insert (312 for example) which is a tight fit in the hollow core so that it is retained therein. This insert is of PTFE (Polytetrafluoroethylene) and in the form of a tube with a collar at one end. The bore of this tube is large enough to admit freely the wire 232 which passes through the hole 23 and hold this wire within the rod 31 but electrically insulated from the rod. The wire 232 can be moved axially and locked by screw 231 as described below.

The rods are positioned laterally by bars 51, 52, 53 in which holes are drilled at the required rod spacing to be a push fit over the rods. The rod spacing is determined by the coupling impedance required between the filter rod elements to provide the desired filter characteristic.

The bars 51, 52, 53 are of insulating material such as polystyrene. In the preferred embodiment a silicone resin bonded fiber glass is used. Although this is a less satisfactory dielectric than polystyrene its mechanical properties are better. In particular it is essential that the holes spacing is maintained and that the bar material does not flow in use. Some plastics are unsuitable for this reason. Poor dielectric properties can be offset by countersinking the holes to reduce the area of material in contact with the rod. Sufficient material must of course be left to ensure mechanical stability of the rods.

Returning to FIG. 2, a baseplate 1 of an L-shaped section of metal, preferably copper although aluminum or nickel-plated copper are suitable, is attached to end blocks 2 and 3 by screws (not shown). The end blocks are mounted on the plate 1 to produce the interdigital arrangement of the rods shown in FIG. 2.

Connections to the filter will now be described with reference to FIG. 3. The connections are by coaxial cable, 41. In the preferred embodiment this is 50 Ω cable.

The hollow core of rod 22 is so dimensioned that the inner insulator 411 of the coaxial cable can pass along it and out through slot 221. The inner conductor can be soldered to baseplate 1, which is one ground plane, through a hole at 11. A right angle sleeve 42 is a sliding fit over the protruding portion 222 of rod 22.

The sleeve is also a sliding fit over the outer conductor braiding 412 of cable 41 when the braiding is doubled back over the outer sheath of the cable. The braid and rod are soldered to the sleeve 42 by introducing solder through holes such as 421 in the sleeve. The alignment of cable 41 is set before soldering sleeve 42 to rod 222 to prevent cable 41 obstructing wire 232. A similar connection is made to rod 32 and either connection may be the input or output of the filter.

The case of the filter is completed by another L-shaped section (not shown), similar to 1, which is screwed to the other side of blocks 2 and 3 from section 1. The edges of the case sections are joined by solder fillets adjacent to hole 11 in region indicated at 13 and the equivalent hole, 12, not shown, for rod 32. The case sections have slots to clear the screws 231.

The electrical performance of the filter is now described. As stated above the rod elements have an impedance of some 70 Ω while the cable 41 is of some 50Ω impedance. It is necessary to couple the input energy of the filter to the rod without mismatch or discontinuity. This is normally done by the isolated λ/4 rods described above. However in the described embodiments the normal connections are modified. The outer of the cable is still connected to the case of the filter, at 222, but the inner is also connected to the case at 11. The position of slot 221 ensures that the input energy is transferred to the rod 22 in a matched manner. The slot position can be obtained approximately by calculation but the final position is best determined by experiment. The criterion is that the connection should appear as near to a 50Ω load or source to the cable as possible while obtaining an optimum value of Q for the filter.

This coupling arrangement provides an almost discontinuity free connection as the diameter of the braid is continued in the diameter of the rod core. The only gap is in the elbow of the sleeve 42. This does not introduce any serious discontinuity. If the discontinuity is significant adjustment of the slot (221) position or the capacitor (described next) can be made to offset it.

In the preferred embodiment a right-angle connection was used to reduce the overall length of the filter but the outer conductor of the cable could be attached directly to the rod or by the use of a straight sleeve.

It is stated above that the rods are shorter than λ/4 in the preferred embodiment. The change in parameter this introduces is offset by the capacitor formed by the wire 232 and the end of the rod 31 (for example).

This maintains the required LC product and at the same time provides a simple trimming capacitor instead of the screw and nut adjuster described above. Adjustment is made by moving the wire 232 with screw 231 loose and locking screw 231 when the correct tuning position is obtained. Any surplus wire outside the case can then be cut off leaving a clear face to block 2. This capacitor is also quite suitable for use with up to full λ/4 rod elements, the dielectric material and wire size being easily changed to obtain a range of values of capacity. The wire is bare tinned copper. The construction of the preferred embodiment provides a very compact filter which is also economical to manufacture and align. When the reduced length rods elements are used the overall size of the filter case and connection leads is less than the normal λ/4 rods themselves. Furthermore the trimming capacitors do not take up space outside the case and only require a screwdriver for locking whereas a spanner is also required for the screw and locknut method. The critical tolerance of the filter is the spacing of the holes in bars 51, 52, 53. These bars ensure the parallelism of the rod elements which determines the filter response.

The reduction in size for a given frequency of operation enables the interdigital filter to be used in equipment of smaller size while retaining the advantages of distributed constant filters at ultrahigh frequencies. The compact, flat construction, which is about one-quarter the volume of an interdigital filter made in the usual manner, is most suitable for use with printed circuit card equipment. The connections used reduce the space for connectors and leads and reduce the number of discontinuities.

We claim:

1. An interdigital filter comprising a plurality of rod elements spaced between two outermost rod elements, means connecting one end of each of the rod elements to a ground plane, input and output connections to the filter coupling points on the ground plane to the outermost rod elements at regions thereof having an impedance close to the value of the characteristic impedance of a coupling cable, the outermost rod elements incorporating hollow ends connected to the ground plane to permit the passage of an insulated conductor of a cable through the respective rod to one of said regions, and a slot in the wall of the rod in said region permitting the passage of the conductor for connection to the ground plane at said point.

2. An interdigital filter as claimed in claim 1 in which the coupling cable is coaxial, in which the inner diameter of the hollow rod is that of the outer conductor of said coaxial cable and in which a conducting sleeve connects the outer conductor to the hollow rod at the junction of the rod and the ground plane.

3. An interdigital filter as claimed in claim 1, in which the case is of metal sections joined together only adjacent to the points where electrical connection is made to the case.

4. An interdigital filter comprising two ground planes formed by the metallic walls of a rectangular tube, a plurality of conductor elements arranged as interdigital conductor elements, support members for the interdigitated conductor elements of the filter, the support members closing the tube at each end, the conductor elements including round rods connected electrically and mechanically at one end to the respective support members, the two outermost rods in the tube having hollow sections at said connected ends, means for completing signal connections to the filter including a coaxial cable whose outer conductor dimensions corresponds to the internal diameter of the outermost rods, and the cable including an insulated inner conductor and insulator of the cable passing through the respective hollow rod to a slot in the wall of the rod and thence to a connection to a ground plane at a point adjacent the region of the slotted rod having an impedance close to the characteristic impedance of the cable, the outer conductor being connected to the respective rod at its junction with the ground plane.

5. An interdigital filter as claimed in claim 4 in which the conductor elements are held at the correct spacing by a plurality of insulating blocks with bores tightly fitting on said elements.

6. An interdigital filter as claimed in claim 4 in which a trimming capacitor for a conductor element is formed by inserting a dielectric sleeve into the hollow outer end of the element and placing a conductor inside the sleeve, said conductor passing through the support member adjacent the outer end of the element, the length of the conductor within the sleeve being adjustable, and in which the conductor is held in electrical connection with the support member and in the correct adjustment by a setscrew in the support member.

7. An interdigital filter comprising a plurality of rod elements spaced between two outermost rod elements, means connecting one end of each of the rod elements to a ground plane, input and output connections to the filter coupling points on the ground plane to the outermost rod elements at regions thereof having an impedance close to the value of the characteristic impedance of a coupling cable, the free end of at least one rod being hollow and having an insulating sleeve therein and one end of a conductor in said sleeve being electrically connected to the ground plane to form a capacitor of which one plate is the conductor, the other plate the rod and the dielectric the sleeve.

8. An interdigital filter as claimed in claim 7, in which the conductor is adjustably clamped to the ground plane to form a trimming capacitor for tuning said at least one rod element to a desired frequency.

9. An interdigital filter as claimed in claim 7, in which said conductor is a wire clamped in a hole in said ground plane by a setscrew.

10. An interdigital filter as claimed in claim 7, in which said at least one rod is shorter than λ/4 wavelength at the desired resonant frequency of the rod and is brought into resonance at said desired resonant frequency by said capacitor.